United States Patent [19]

Ito et al.

[11] 3,839,139

[45] Oct. 1, 1974

[54] LIGHT-OCCLUDING AND WATER-PERMEABLE SHEET

[75] Inventors: Koujirou Ito; Atsuo Ishimoto; Yuzo Yamada, all of Kyoto; Hiroshi Inoue, Hyogo; Takashi Nozu, Kyoto, all of Japan

[73] Assignee: Unitika, Ltd., Amagasaki-shi, Hyogo, Japan

[22] Filed: June 26, 1973

[21] Appl. No.: 373,845

[30] Foreign Application Priority Data
June 26, 1972  Japan.............................. 47-63862
Mar. 22, 1973  Japan.............................. 48-32988

[52] U.S. Cl........................................ 161/170, 47/9
[51] Int. Cl........................................ D04h 13/00
[58] Field of Search ............ 161/170, 168; 52/103; 5/344; 47/9

[56] References Cited
UNITED STATES PATENTS

| | | | |
|---|---|---|---|
| 3,252,250 | 5/1966 | Lemaire.................................. | 47/9 |
| 3,287,850 | 11/1966 | Da Valle................................. | 47/9 |
| 3,616,180 | 10/1971 | Newman.............................. | 161/170 |
| 3,704,198 | 11/1972 | Prentice............................... | 161/170 |
| 3,795,571 | 3/1974 | Prentice............................... | 161/170 |

*Primary Examiner*—William E. Schulz
*Attorney, Agent, or Firm*—Sughrue, Rothwell, Mion, Zinn & Macpeak

[57]  ABSTRACT

A light-occluding and water-permeable non-woven sheet suitable for use as a weed growth inhibiting sheet, heat insulating sheet or light-shielding sheet, comprising a non-woven sheet of continuous filaments having a solar ray-absorbing substance such as carbon black contained therein or coated on their surfaces, said non-woven sheet having a light-occluding rate of at least 60 percent, a water-permeability of at least 40 percent and a unit weight of 20 to 200 g/m$^2$.

14 Claims, No Drawings

LIGHT-OCCLUDING AND WATER-PERMEABLE SHEET

BACKGROUND OF THE INVENTION

1. Field of the Invention

This invention relates to a light-occluding and water-permeable non-woven sheet suitable for use as a weed growth inhibiting sheet, heat insulating sheet or light-shielding sheet.

2. Description of the Prior Art

Light-occluding water-permeable sheets composed of a thin woven fabric have widely been used previously in various industrial fields such as agriculture and construction works. An example is a victoria lawn. Even when these sheets have fully satisfactory properties, they are expensive, and limited in use since an enormous amount of money is required for applying them to a wide area of land. On the other hand, weed growth inhibiting sheets composed of paper or films have recently come into widespread use. This is intended to inhibit the growth of weeds by occluding solar rays with a colored sheet, and such a sheet is advantageous in that the cost of weed cutting can be curtailed, and no noxious action is exerted on man and domestic as well as cultivated plants. However, these weed growth inhibiting sheets have poor water-permeability, and therefore, rain water and liquid fertilizers do not immediately permeate but flow into the depressed parts. Thus, the nutritious components do not spread around the cultivated plants, and the growth of the plants is extremely impeded. Especially in the case of films which completely lack water-permeability, it is necessary to provide water-sprinkling pipes below the sheet, which results in an enormous cost of equipment. Furthermore, the paper and films have the defect that they do not fit intimately to the soil surface, break easily and are blown away by wind and rain. Accordingly, such sheets in general can be used only for a limited period of time, and must be replaced from time to time.

SUMMARY OF THE INVENTION

This invention relates to a light-occluding water-permeable sheet composed of a filamentary non-woven sheet. The non-woven sheet consists of continuous filaments and contains a solar ray-absorbing substance and has a light-occluding rate of at least 60 percent, a water-permeability of at least 40 percent and a unit weight of 20 to 200 g/m$^2$.

Since the sheet of this invention is composed of continuous filaments, it has high drapability and fits well to the ground surface. Furthermore, this sheet has extremely high resistance to external force, e.g., extremely good tensile strength, tear strength or rupture strength, and does not break as is the case with the conventional weed growth inhibiting sheets. The continuous filaments are distributed uniformly over the entire surface of the sheet, and therefore, the sheet has good covering property as compared with scrim sheets such as woven fabrics. The inclusion of the solar ray-absorbing substance in the sheet of this invention confers good light-occluding and heat insulating properties. The light-occluding rate, water-permeability and unit weight ranges specified above are optimum constituent requirements for feasible light-occluding water-permeable sheets.

The sheet of this invention is extremely cheap and durable for long periods of time as compared with the conventional sheets such as a victoria lawn. Because of these properties, the sheet of this invention has wide utility as weed growth-inhibiting, heat-insulating and light-shielding sheets for use in agricultural and construction works.

DETAILED DESCRIPTION OF THE INVENTION

The sheet of this invention is made of a non-woven sheet composed of continuous filaments containing a solar ray-absorbing substance. The solar ray-absorbing substance is a substance which absorbs solar rays effectively, for example carbon black. Other effective solar ray-absorbing substances are black, brown, red brown or green pigments, dyes, or polymer-soluble coloring substances. Carbon black is superior especially for its advantages to be described. (1) Its addition improves the weather resistance of the constituent polymer. (2) It does not change in quality, by use for long time but is very stable. (3) It has very good absorbability of solar rays. (4) It has good dispersibility in polymer. (5) It does not chemically react with polymer (does not suffer from deterioration).

This substance is included in the filaments or coated on their surfaces. Specific procedures for accomplishing this include, for example, the colored polymer method wherein a polymer having a chromophoric group in the molecular chain is used, the dope dyeing method wherein a coloring agent is dispersed or dissolved in a polymer, and then the dispersion or solution is spun, a method wherein a polymer is formed into filaments or sheet, and then dyed, or a method wherein a coloring agent is adhered to the surfaces of filaments or sheet together with an adhesive.

The continuous filaments can be produced by any known method, but a method comprising taking up the filaments extruded from a spin head by means of a roller or an air ejector, and forming them into a sheet in one step is commercially superior. In any case, it is essential that the filaments be drawn and molecularly oriented before sheet formation. Materials having good weatherability are desirable for production of filaments since they are intended for outdoor use. Suitable examples are polyethylene terephthalate, polyethylene hydroxybenzoate, nylon 66, polyvinyl alcohol, polyacrylonitrile, polyacrylates, polyvinyl chloride, polyvinylidene chloride, glassfibers, or copolymers or blends containing any of these as a main constituent. Polyethylene terephthalate and nylon 66 are especially valuable for practical purposes because of their melt-spinnability, relatively low cost, and ease of forming composite fibers, etc. In special instances where, for example, the resultant sheet is intended for use for a very short period of time, e.g., one season only, polymers such as polyethylene or polypropylene are cheap and effective.

In the formation of a non-woven sheet from filaments, the filaments which have been taken up by a roll or an air ejector are blown uniformly against a moving, air-permeable laydown surface, and the air stream is sucked from below the surface to form an accumulated web. At this time, the filaments are arranged in a layered form with the individual filaments forming innumerable continuous loops of indefinite shapes. The web is cohered by such treatments as adhesive bonding, hot calendering or hot embossing. The manufacturing conditions are prescribed so that the final sheet has a light-occluding rate of at least 60 percent, a water-permeability of at least 40 percent and a unit weight of 20 to 200 g/m².

The light-occluding rate is a measure of the ability of the sheet to occlude solar rays, and expressed by the following equation.

Light-occluding rate (%) = $(1 - L/L_0) \times 100$ wherein L is the illumination in lux of the sheet when the sheet is irradiated with solar rays (natural light) under a shade in a fine weather; and $L_0$ is the blank illumination in lux of solar rays measured under the same conditions except the sheet is removed.

The measurement is made under the following conditions.

Sample: five sheets (30 cm × 30 cm) cut out from any desired places.

Measuring instrument: photocell illuminometer (for example, Toshiba SPI-5)

Dark box for measurement: 20 cm × 20 cm × 20 cm, the inside wall is painted black, and the illuminometer is disposed at the center of its bottom.

Measuring method: The sheet is placed so as to completely cover the opening of the dark box, and the illumination L is measured. Then, the blank illumination $L_0$ is measured in the same place at substantially the same time of the day after removing the sheet.

This measurement is made on each of the samples, and an average value is determined.

The water-permeability is a measure of the permeability of rain water through the cross section of the sheet when the sheet is spread on an inclined surface, and defined by the following equation.

Water permeability (%) = $S/S_0 \times 100$ wherein S is the amount of water that passed through the sheet (the amount of water in cubic centimeters received by a Bundesmann receiver when the sheet is mounted thereon), and $S_0$ is the blank amount of water (the amount of water in cubic centimeters received by the receiver when the sheet is not mounted thereon).

The measurement was made under the following conditions.

Sample: 5 samples each with a diameter of 10 cm

Measuring instrument: Bundessmann water repelling tester (the receiver is used in the stationary state)

Spraying nozzle: JIS L-1079, diameter 0.889 mm × 19 holes

Measuring method: The tester is set so that the nozzle surface of a funnel is situated at a position 45 cm at its center away from the upper surface of the receiver. Water is poured into the funnel to the full, and while always maintaining its water surface, water in a total amount of 750 ml. is poured. At this time, the sheet is mounted on the receiver immediately beneath it (inclined at 15 feet to the horizontal plane), and the amount (S) of water gathering in the receiver is measured. The sheet is then dismounted, and the same water sprinkling test as above is carried out, and the amount ($S_0$) of water gathering in the receiver is measured. This procedure is repeated 5 times. The calculation is made in accordance with the above equation, and the average value is calculated.

The unit weight of the sheet is measured in accordance with the method provided in JIS L-1079.

The amount of carbon black or a mixture consisting predominantly of carbon black applied to the filaments as the solar ray-absorbing substance is preferably 0.1 to 5 percent by weight based on the total weight of the filaments when it is incorporated into the filaments, and 1 to 15 percent by weight when it is adhered to the filaments using an adhesive.

More specific filament and sheet forms are selected according to uses without departing from the characteristic factors described above.

For uses which especially require heat insulating and air-permeable properties rather than light-occluding property such as light-occluding sheets for tea-plants or weed-growth inhibiting sheets for orchard for citrus fruits, there are selected non-woven sheets composed of continuous filaments having at least 3, preferably at least 10, helical crimps per inch and having an apparent density of 0.01 to 0.5 g/cm³. Such a sheet is used also as a weed-growth preventing sheet, but will be named a heat-insulating light-occluding sheet because of its especially superior heat insulating effect.

The apparent density, as used herein, is a value defined by the following equation.

Apparent density (g/cm³) = $M/1000\,n$ wherein M is the unit weight (g/m²) of the sheet, and $n$ is the thickness (cm) of the sheet.

The number of crimps is the number of crimps per inch when a load of 2 mg/d is exerted per single filament.

For uses which especially require light-occluding and weed-growth inhibiting properties, there are selected non-woven sheets composed of continuous filaments with no crimps or with not more than two crimps per inch, and having an apparent density of 0.1 to 1 g/cm³, a light-occluding rate of at least 90 percent and a water-permeability of at least 70 percent. (Such a sheet is named a weed-growth inhibiting and light-occluding sheet.)

In order to produce the heat-insulating light-occluding sheet, two polymer components having different shrinkages are co-spun, and crimps are developed during the formation of a web or immediately after it; and then, a bonded sheet is obtained by directly subjecting the web to an adhering treatment. This sheet has bulkiness and stretchability, and superior heat absorbing property and heat-insulating property. Such a sheet also fits well when covering the soil surface and cultivated plants. The production of the weed-growth inhibiting and light-occluding sheet involves spinning a single fiber-forming material, forming a laid-down web by the method described above, and subjecting the web to an adhering treatment either as such or after a heat-bonding treatment such as hot calendering or hot embossing. Where the sheet is used as a weed-growth inhibiting sheet, it is required to have good resistance to repeated friction (resistance to fuzzing) because the working personnel performs various operations while stamping on the sheet. Accordingly, in this case, both the heat bonding treatment and the adhering treatment become necessary for producing the sheet. Especially when the sheet is subjected to an embossing treatment with a bonded area rate of 15 to 85 percent, the resulting sheet has superior water-permeability, and the amount of an adhesive to be used subsequently may be small. The bonded area rate is the proportion of the bonded area to the entire area of the sheet. When the resistance to fuzzing is not so rigorously required, the sheet bonded only by embossing sufficiently serves for the purpose. As described above, the colored polymer method and the dope dyeing method are available for including the solar ray-absorbing substance into the filaments. As an example of the former, there can be employed a method of dyeing in red brown such polymers as nylon 66 or polyvinyl alcohol by ionizing radiation treatment in an atmosphere of oxygen. The lattermentioned method involves incorporating a solar ray-absorbing coloring substance such as a pigment or dye into the spinning material either as such or as a master chip, and spinning the mixture. In this case, the coloring substance is uniformly dispersed or dissolved in the filaments. The coloring substance may also be distributed at different densities in the sectional areas of the filaments. Such a method consists in using a core-and-sheath type composite filament, and including the coloring substance only in the sheath component or including it into the sheath component at a larger density than in the core component. This has the advantage that solar rays can be effectively absorbed and the amount of the coloring substance can be reduced.

The method of coating the surfaces of the filaments with the solar ray-absorbing substance includes a method wherein the coloring substance is dispersed or dissolved in an adhesive, or a method wherein a colored adhesive is used.

The adhesive to be used in the above-mentioned methods may be any adhesives which have previously been used for preparation of non-woven cloths. From the viewpoint of weatherability, bonding strength and hydrophilicity, acrylate resins, ethylene/vinyl acetate copolymers, and vinyl chloride/vinylidene chloride copolymers are useful. Methods of self-bonding without using adhesives can also be used. An effective method comprises using core-and-sheath type composite filaments in which the sheath component has a lower melting point than the core component to render the sheath component heat-adhesive, and subjecting the filaments to hot calendering or hot embossing thereby to heat bond the numerous filaments with one another. This method has the advantage that the bonding can be completed under milder conditions than in the ordinary hot calendering or hot embossing, and strong bonding effects can be obtained. This method is especially effective when applied to core-and-sheath composite filaments including the solar ray-absorbing substance in its sheath component. Furthermore, in adhering the solar-ray absorbing substance to the filaments, fine particles of an inorganic substance such as soil and sand, clay, ash, or slag, and/or staple fibers such as pulp, synthetic pulp, fiber wastes, or rock wool may effectively be dispersed in the adhesive to be used, in order to increase the light-occluding property, hydrophilicity and weatherability and to reduce the cost of production.

The sheets of the present invention obtained by the above methods are effectively utilized as weed-growth inhibiting sheets for preventing the growth of weeds in orchards, young tree cultivating fields, vegetable and cereal growing fields, etc., and light-occluding sheets and heat-insulating sheets which control the state of growth and increase the harvest. They can also be utilized widely in construction works and in the chemical industry as, for example, concrete aging sheets, heat insulating sheets for pipes or frost-proofing sheets for ground.

When the sheet is spread on the surface of the field for cultivated plants, it exhibits a weed-growth inhibiting effect by the following two actions, namely, (1) it occludes solar rays and obstructs the growth of weed seeds, and (2) the space between the sheet and the field surface is at an extremely high temperature and this causes the withering of weeds already growing. In addition to these, it also produces the effects of markedly increasing the rate of fertilizer utilization of the soil to increase the harvest with a small amount of fertilizer, and improving the strength of the plants to increase their resistance to disease and pests (the use of agricultural chemicals can be saved), as a result of the following advantages. That is, (1) In the daytime solar rays are absorbed to raise the temperature of the ground surface moderately, and at night, heat dissipation from the ground surface is reduced, thus maintaining the growing atmosphere of cultivated plants at moderate warm temperatures all the day; and (2) The soil surface is prevented from direct exposure to sunlight or rain, and the air-permeability, water-permeability and water-retainability are maintained in an ideal condition, whereby the granulation of the soil is promoted. In addition, the sheets of this invention well fit when covering the field surfaces having much undulation and cultivated plants, and are tough and not easily breakable. These advantages are very useful as agricultural sheets.

The present invention will be further described by the following Examples.

EXAMPLE 1

Polyethylene terephthalate containing 0.05 percent of titanium oxide and 1 percent of carbon black was melt spun, and the filaments were blown against a screen belt using a high velocity air stream and laid down in sheet form thereby to form a non-woven web having a unit weight of 49.3 g/m$^2$ which was black in color. The web was embossed at 245°C. and 20 kg/cm$^2$ using an emboss roller having a check pattern and a bonded area rate of 50 percent to form a bonded sheet. This sheet had an apparent density of 0.22 g/cm$^3$ a light-occluding rate of 93 percent and a water-permeability of 78 percent. The sheet was spread on an orange orchard with an area of 5 hectares, and oranges were grown using liquid fertilizer. As a result, weeds grown before the covering of the sheet were completely withered in 3 months, and thereafter, no weed was grown. The yield increase effect in this orchard is shown by numerical values. The sheet was not substantially degraded after using for 3 years.

Table 1

| Using 40 kg of nitrogen fertilizer, 20 kg of phosphate fertilizer and 32 kg of potassium fertilizer | | |
|---|---|---|
| No. | Use of sheet | Harvest of orange (tons/year) |
| 1 | No | 5 |
| 2 | Yes | 14 |

Example 2

Nylon 66 containing a carbon black of 1.5 percent and a light stabilizer was co-spun, and a non-woven web was produced in the same way as in Example 1. The web was subjected to an adhering treatment using an acrylate type binder.

Filaments: 5 denier, 12 crimps per inch

Sheet: apparent density 0.03 g/cm³, thickness 2 mm, adhesive take-up 30 percent, unit weight 50 g/m²

The sheet obtained was spread on the surface of a 5 hectare orange orchard. Holes were provided only at the tree portions. The joint portions of the sheet were melt-adhered. In order to increase intimate contact of the sheet with the ground surface, wedges were struck in here and there in the sheet. Sprinklers for irrigation and fertilizer application were provided at intervals of about 20 meters. Water and liquid fertilizer were sprayed every day periodically. Agricultural chemicals were sprayed by a sprayer on every tree once or twice a year. Once in several months, withered leaves, rotten leaves, fallen oranges, sand and dust which were accumulated on the sheet and weeds which flew to the sheet, budded there and stretched to the ground surface were swept off. Weeds which grew before the covering of the sheet were completely withered in 3 months, and no weed grew thereafter.

For comparison, the same test was conducted on a paper sheet dyed with a black dye and a film of a black pigment-incorporated polyethylene. In 3 to 4 months from the covering, the sheet began to break at the portions at which wedges were struck in, and weeds began to grow at these portions. These breakages grew bigger during the above sweeping operation, and the sheet became almost useless in 6 months.

The yield increasing effect of this sheet will be shown below by numerical values on the basis of the actual results in this orchard for 4 years.

Table 2

|  | Before use of sheet | During the use of sheet | | | Rate of decrease of fertilizer application in the third year |
|---|---|---|---|---|---|
|  |  | 1st year | second year | third year |  |
| Nitrogen fertilizer | 40 | 23 | 15 | 12 | 70 |
| Phosphate fertilizer | 20 | 12 | 13 | 9 | 50 |
| Potassium fertilizer | 32 | 20 | 13 | 9 | 69 |

It is seen from the results obtained that in about 3 years after the use of this sheet, the amount of fertilizer required was reduced to about one-third as compared with the case of not using the sheet.

As illustrated above, the weed-growth inhibiting sheet of this invention produces a greater effect when used in conjunction with the application of liquid fertilizers.

Example 3

Polyethylene terephthalate containing light stabilizer was melt spun, and a non-colored non-woven web having a unit weight of 40 g/m² was obtained in the same way as in Example 1. This web was heat-bonded by use of hot calender roll at the temperature of 210°C and the pressure of 30 kg/cm², and adhered together with coloring using polyacrylate binder containing carbon black.

The sheet obtained had following properties.
Filament: 6 denier
Sheet: apparent density 0.25 g/cm³
unit weight 48 g/m²
adhesive take-up 20 percent
carbon black take-up 4 percent
light occluding rate 92 percent
water-permeability 80 percent The sheet was spread on the surface of a maple plantation. Consequently excellent result shown below was obtained.

Table 3

| Growth circumstances after 1 year from planting of sapling | | | |
|---|---|---|---|
| No. | Use of sheet | Growth rate of sapling | Growth of weed |
| 1 | No | 100 | heavy |
| 2 | Yes | 150 | quite poor |

Example 4

Polyethylene terephthalate containing a carbon black of 0.6 percent was melt spun, and a black non-woven web having a unit weight of 45 g/m² was obtained in the same way as in Example 1. This web was embossed at 245°C and 20 kg/cm² using an emboss roller having a woven pattern and a bonded area rate of 17 percent and using polyacrylate-type binder.
Filaments: 10 denier
Sheet: unit weight 50g/m²
apparent density 0.12 g/cm³
adhesive take-up 10 percent
light-occluding rate 75 percent
water-permeability 86 percent The sheet was used as light-occluding sheet in the tea-plantation. As a result the crop of first class tea showed an increase of 30 percent and the taste and flavor of the tea obtained were excellent.

While the invention has been described in detail and with reference to specific embodiments thereof, it will be apparent to one skilled in the art that various changes and modifications can be made therein without departing from the spirit and the scope thereof.

What we claim is:

1. A light-occluding water-permeable non-woven sheet composed of continuous filaments, said sheet containing a solar ray-absorbing substance, and having a light-occluding rate of at least 60 percent, a water-permeability of at least 40 percent, and a unit weight of 20 to 200 g/m².

2. The light-occluding water-permeable sheet of claim 1 suitable as a mulching light-occluding sheet, said sheet being a non-woven sheet composed of continuous filaments having no crimps or not more than two loose crimps per inch, and having an apparent density of 0.1 to 1 g/cm³, a light-occluding rate of at least 90 percent and a water-permeability of at least 70 percent.

3. The light-occluding water-permeable sheet of claim 1 suitable as a heat-insulating light-occluding sheet, said sheet being a non-woven sheet composed of continuous filaments having at least three helical crimps per inch, and having an apparent density of 0.01 to 0.5 g/cm³.

4. The light-occluding water-permeable sheet of claim 2 wherein the constituent filaments are bonded at numerous bonding points, said bonding points being heat-bonded and adhered by an adhesive.

5. The light-occluding water-permeable sheet of claim 2 wherein the constituent filaments are bonded at numerous bonding points, said bonding points being heat bonded in an embossed pattern or further adhered by an adhesive.

6. The light-occluding water-permeable sheet of claim 5 wherein the proportion of the bonded area to the entire area of the sheet is 15 to 85 percent.

7. The light-occluding water-permeable sheet of claim 1 wherein said filaments are composed mainly of polyethylene terephthalate.

8. The light-occluding water-permeable sheet of claim 1 wherein said filaments are composed mainly of nylon 66.

9. The light-occluding water-permeable sheet of claim 1 wherein said solar ray-absorbing substance is carbon black or a mixture consisting predominantly of carbon black.

10. The light-occluding water-permeable sheet of claim 1 wherein said solar ray-absorbing substance is carbon black or a mixture consisting mainly of carbon black, said substance being dispersed in the polymer constituting the filaments, and the amount of carbon black being 0.1 to 5 percent by weight based on the total weight of the filaments.

11. The light-occluding water-permeable sheet of claim 1 wherein said solar ray-absorbing substance is carbon black or a mixture consisting mainly of carbon black, said substance being adhered to the filaments by an adhesive, the amount of carbon black being 1 to 15 percent by weight based on the total weight of the filaments.

12. The light-occluding water-permeable sheet of claim 1 wherein said filaments being core-and-sheath type composite filaments in which the solar ray-absorbing substance is present only in the sheath component, or is present in the sheath component in a larger density than in the core component.

13. The light-occluding water-permeable sheet of claim 1 wherein said filaments are composed of core-and-sheath type composite filaments in which the sheath component has a lower melting point than the core component and the sheath component has heat-adhesive property, and the numerous filaments are heat bonded to one another.

14. The light-occluding water-permeable sheet of claim 1 wherein the fine particles of an inorganic substance such as soil and sand, clay, ash or slag, and/or staple fibers such as pulp, synthetic pulp, fiber wastes or rock wool are adhered to the surfaces of the filaments by an adhesive either alone or together with the solar ray-absorbing substance.

* * * * *